United States Patent Office 3,373,139

Patented Mar. 12, 1968

3,373,139

POLYURETHANES PREPARED FROM 4,4'-(HEXAFLUOROISOPROPYLIDENE)DIPHENOL AND DIAMINES

Paul Winthrop Morgan, West Chester, Pa., assignor to E. I. du Pont de Nemours and Company, Wilmington, Del., a corporation of Delaware No Drawing. Filed Dec. 30, 1964, Ser. No. 422,436
7 Claims. (Cl. 260—47)

ABSTRACT OF THE DISCLOSURE

High melting polyurethanes suitable for use in the manufacture of fibers for wash-wear fabrics are prepared from selected bisphenols and diamines.

*Detailed description of the invention*

For various reasons the presently known polyurethanes have not attained the commercial prominence of the polyamides and polyesters to which they are structurally related. The fabrication of polyurethanes into fibers and films has often been hampered by poor chemical stability of the polymer at the temperatures required for melt processing or by insufficient polymer solubility for use of conventional solvent processing techniques. Moreover, the polyurethanes which have been found fabricable frequently lack the balance of properties which is necessary for their use in fiber and film applications. Among those undesirable characteristics contributing to poor performance for polyurethane fibers and films may be named the following: melting points sufficiently low to permit filament fusion during ironing, poor hot-wet recovery properties after washing, poor flex performance, sensitivity to dry cleaning solvents, and sensitivity to light.

One object of this invention is to provide polyurethanes suitable for the production of light-stable, high melting, soiling-resistant, flexible films and filaments. A further object is to provide polyurethane fibers which are particularly adaptable for fabrics that are wash-wearable, i.e., fabrics which ideally resist wrinkling in use and which can be laundered and subsequently worn without ironing. Other objects will appear hereinafter.

The objects of this invention are accomplished by preparing high molecular weight fiber- and film-forming polyurethanes which possess recurring units represented by the following structural formula:

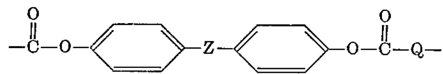

wherein Q represents piperazinylene, lower alkyl substituted piperazinylene or

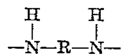

wherein R is a meta-phenylene, paraphenylene, paraxylylene, $\alpha,\alpha,\alpha',\alpha'$-tetramethyl-para-xylylene, or a lower alkylidene di(para-cyclohexylene) radical; and Z is a divalent radical containing no more than about six carbon atoms and having the formula $$-\underset{\substack{|\\ Y}}{\overset{\substack{X\\ |}}{C}}-$$

wherein X and Y may be the same or different and represent perhalogenated lower alkyl groups, fluorine and chlorine being the preferred halogen species, with the provision that X and Y may, together with the carbon atom to which they are attached, constitute a perfluorinated cyclic hydrocarbon group.

The instant polymers may be prepared from nearly equimolar amounts of the bischloroformate of an appropriate diphenol and the appropriate diamine by interfacial polymerization which is accomplished by dissolving the diamine in aqueous alkali, dissolving the bischloroformate in a water-immiscible organic solvent, and combining the two phases with vigorous agitation. A catalyst, such as a quaternary ammonium salt, may also be employed. A second organic solvent, different from the one in which the bischloroformate is dissolved, may be added at the conclusion of the reaction period in order to precipitate the polymer. In some instances, it may be desirable to dissolve the diamine in a small amount of the former organic solvent before the bischloroformate portion is mixed with the diamine-alkali portion. This procedure is beneficial when the diamine has low solubility in water.

The polyurethanes of the present invention may also be prepared by modification of the usual interfacial polymerization method. This modification consists in the use of two solvents which are miscible with each other, for example, tetrahydrofuran and water, but which become immiscible as the polymerization reaction proceeds. When the polymerization is completed, the two liquid layers are separated and the polymer containing portion is used directly for the dry spinning of filaments.

Suitable bischloroformates for the purpose of this invention may be represented by the formula:

Formula I 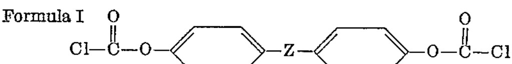

wherein Z has the same significance set forth hereinbefore. They may be prepared from bisphenols of the formula:

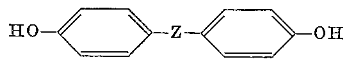

The bisphenols of this structure may be prepared by the method of Knunyants et al. (Bull. Acad. Sci. USSR, Div. of Chem. Sci., 1960, 647–653; English edition) in which phenol and the appropriate fluoroketone are condensed in the presence of anhydrous hydrogen fluoride, or by the sulfuric acid catalyzed condensation of an appropriate halogenated ketone with phenol by a procedure similar to that of, for example, U.S. Patent 2,435,014 wherein the sulfuric acid catalyzed condensation of hexachloroacetone and diisobutylphenol is described. The latter procedure is especially useful for the preparation of those bisphenols whose aromatic rings are linked by a perfluorinated cyclic bridging group.

Preferred among the bischloroformates which are useful in the practice of this invention are the bischloroformates of 4,4'-(hexafluoroisopropylidene)diphenol, 4,4'-(chloropentafluoroisopropylidene)diphenol, 4,4'(sym-dichlorotetrafluoroisopropylidene)diphenol, or 4,4'-(hexafluorocyclobutylidene)-diphenol.

Suitable diamine reactants are piperazine, the lower alkyl substituted piperazines and diamines of the formula:

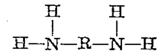

where R has the significance designated above. Illustrative of the diamines which are useful in the preparation of the high melting polymers of this invention are: piperazine, methylpiperazine, ethylpiperazine, trans - 2,5 - dimethylpiperazine, meta-phenylenediamine, $\alpha,\alpha,\alpha',\alpha'$-tetramethyl-para-xylylenediamine, N,N'-diphenyl-para-phenylenediamine, bis(4-aminocyclohexyl)methane (70%-trans, trans isomer), and para-xylylenediamine. Linear aliphatic diamines, such as hexamethylenediamine, when used in the process of this invention, yield polyurethanes having significantly lower melting points.

The preferred polyurethanes are those prepared from the bischloroformate of 4,4'-(hexafluoroisopropylidene)

diphenol and 2-methylpiperazine, trans-2,5-dimethylpiperazine, or bis(4-aminocyclohexyl)methane.

Useful polyurethanes of this invention include poly[(chloropentafluoroisopropylidene)di - p - phenylene 2-methyl-1,4-piperazinedicarboxylate], poly[(sym-dichlorotetrafluoroisopropylidene) di - p-phenylene trans-2,5-dimethyl-1,4-piperazinedicarboxylate], and poly[(hexafluorocyclobutylidene) di-p-phenylene 4,4′-methylenedicyclohexanecarbamate].

Copolymers such as are produced by the use of mixtures of bischloroformates or diamines of the aforementioned designations are intended as being within the scope of Formula I. Up to 50% of the bischloroformate reactants may be replaced with the bischloroformate of 4,4′-isopropylidene bis(2,6-dichlorophenol).

The polyurethanes of this invention can be cast into films or dry spun in filamentary form from solutions containing about 10–30% by weight of a polymer dissolved in a solvent selected from the class consisting of tetrahydrofuran, cyclopentanone, cyclohexanone, and chlorinated hydrocarbons such as chloroform. In addition, the polyurethanes of this invention can be spun into filamentary form by conventional wet spinning procedures. The instant polymers are readily and permanently orientable by attenuation and can be obtained in a crystalline state.

The polyurethanes of this invention possess melting points in excess of 200° C., with some having melting points of 300° C. or higher. This thermal stability is an important property in the synthetic textile trade, since many promising synthetic fibers have had only limited acceptance due to the low softening temperatures which they exhibit. Fibers and films prepared from the polymers of this invention display excellent resistance to degradation by ultraviolet light, as witnessed by their color stability upon prolonged exposure (greater than 1000 hours) to the light from xenon arc placed in a model FDA-R Fade-Ometer, a product of the Atlas Electric Devices Co., Chicago, Illinois. In contrast to the textile products obtained from the polyurethanes of the prior art, the unusual combination of desirable properties shown by filaments and fabrics prepared from these polyurethanes favors their commercial acceptance in the textile trade. Included in this list of properties, in addition to the previously-cited thermal stability and resistance to degradation by light, are an excellent recovery of form without ironing when exposed to hot-wet conditions of home laundering, resistance to soiling, bleach resistant, resistance to hydrolysis and degradation by aqueous alkali and acid, and low flammability. Films prepared from the polyurethanes of this invention are clear and flexible and are useful as wrapping and packaging materials, containers, covers, closures, and related uses where direct exposure to elemental conditions is inherent.

The following nonlimiting examples are illustrative of the practice of the preferred embodiment of the invention. In these examples, inherent viscosity ($\eta$ inh) has been determined in accordance with the following equation:

$$\eta \text{ inh} = \frac{\ln (\eta \text{ rel})}{C}$$

The relative viscosity ($\eta$ rel) may be determined by dividing the flow time in a capillary viscometer of a dilute solution of the polymer by the flow time for the pure solvent. The concentration (C) used in the examples is 0.5 gram of polymer per 100 ml. of solution and the measurements are made at 30° C. Unless otherwise specified, inherent viscosities are measured in meta-cresol and under the aforementioned conditions of measurement, the polymers of the invention have an inherent viscosity of at least 0.2. As used herein, the "polymer melt temperature," abbreviated "PMT," is defined as that temperature at which a polymer sample becomes molten and leaves a trail when moved across a hot metal surface under moderate pressure.

EXAMPLE I

This example illustrates the preparation of 4,4′-(hexafluoroisopropylidene)bis(phenylchloroformate) from 4,4′-(hexafluoroisopropylidene)diphenol. Synthesis of the latter is described by Knunyants et al., Bull. Acad. Sci. USSR, Div. of Chem. Sci., 1960, 647–653.

A reaction mixture comprising 50 g. (0.148 mole) of 4,4′-(hexafluoroisopropylidene)diphenol, 200 g. (2.02 moles) of phosgene, and 1.5 g. of N,N-dimethylformamide is heated for 6–8 hours in a Hastalloy alloy bomb whose internal temperature is maintained at 140° C. At the conclusion of the reaction period, the excess phosgene is vented. The residual product, a viscous oil, is subjected to vacuum distillation whereby a fraction (A) boiling at 157–160° C./0.3 mm., a pale yellow syrup, and a fraction (B) boiling at 170° C./0.5 mm., a clear liquid, are collected, leaving a brown tar in the distillation pot. Then fractions (A) and (B) are permitted to stand for about 48 hours, during which time they spontaneously crystallize.

The yields are 29.5 g. and 26.5 g., respectively, and both samples melt sharply at 69–70° C. A mixed melting point determination shows no variation. The yield of 4,4′-(hexafluoroisopropylidene) bis (phenylchloroformate) is 79.5%.

EXAMPLE II

This example demonstrates the preparation of a polyurethane of this invention by interfacial polymerization and describes the properties of a fiber and a film prepared from the product.

In a blender are placed 250 ml. of water, 2.5 g. of 2-methylpiperazine, and 5.3 g. of sodium carbonate. To this is added with vigorous stirring a solution of 11.52 g. of the bischloroformate of 4,4′-(hexafluoroisopropylidene)diphenol in 100 ml. of 1,2-dichloroethane. After 5 minutes, an equal volume of n-hexane is added to precipitate the polymer. The precipitated polymer is collected, washed with water, and dried. The dried polymer weighs 12.03 g. and has an inherent viscosity of 1.45.

A 10% by weight solution of this polymer in tetrahydrofuran is cast into a clear, flexible film. This film shows no color and remains flexible after 1,200 hrs. exposure in a Fade-Ometer modified with xenon arc.

A sample of this polyurethane, prepared in the manner described above but possessing an inherent viscosity of 0.98, is dissolved in a mixture of tetrahydrofuran/1,1,2-trichloroethane (88/12 by weight) to form a spinning solution containing 20% solids. This solution is dry spun by conventional procedures into filaments which are subsequently drawn 1.6X at 165° C. to give fibers having a denier of 6.5. These filaments exhibit tenacity, elongation, and initial modulus values of 1.6 g.p.d., 31%, and 23 g.p.d., respectively. They also display a high degree of recovery hot-wet washing conditions.

In Table I, below, are summarized some physical properties of polyurethanes of this invention which are prepared in accordance with the interfacial polymerization techniques previously described. Each of the polymers consists of recurring units of the formula:

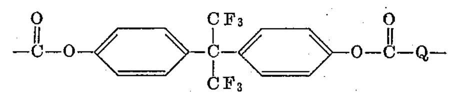

with —Q— having the significance previously indicated. The column of Table I entitled "Diamine" denotes the diamine from which the —Q— portion of the polyurethane recurring unit is derived. The column entitled "Film" describes films which are prepared by conventional procedures from the appropriate polyurethanes.

TABLE I

| Ex. | Diamine | PMT, ° C. | $\eta$ inh | Film |
|---|---|---|---|---|
| III | Piperazine | 260 | 0.57 | Clear, flexible.[a] |
| IV | trans-2,5-dimethylpiperazine. | 300 | 1.60 | Clear, tough.[a] |
| V | 2-ethylpiperazine | 285 | 0.82 | Do. |
| VI | meta-Phenylenediamine | 238 | 0.30 | |
| VII | para-Xylylenediamine | ----- | 0.23 | |
| VIII | N,N'-diphenyl-para-phenylenediamine. | 245 | 0.40 | Clear, flexible.[a] |
| IX | Bis(4-aminocyclohexyl)-methane [c] | 210 | 1.16 | Clear, tough.[a] |
| X | $\alpha,\alpha,\alpha',\alpha'$-Tetramethyl-para-zylylenediamine. | 200 | 0.33 | |

[a] Dry cast on glass plates at room temperature from 10–15% solutions in tetrahydrofuran.
[b] Formed from granular polymer between aluminum foils in a hydraulic press at 240° C. and 7,000 p.s.i. for 2 minutes.
[c] 70%-trans, trans isomer.

EXAMPLE XI

This example further illustrates the utility of polyurethanes of this invention for the preparation of filaments and fabrics possessing desirable properties.

A 60 g. sample of the polyurethane described in Example IV, having an inherent viscosity of 0.93, is dissolved in a mixture of 174 g. of tetrahydrofuran and 6 g. of 1,1,2-trichloroethane to form a clear spinning solution containing 25% solids. This solution is easily dry spun by conventional procedures into a 5-filament yarn which, in turn, is double plied. The yarn is drawn 1.55X at 215–220° C., now exhibiting a denier of 77. These filaments are bright and, after scouring in a relaxed condition in a 0.5% detergent solution, have tenacity, elongation, and initial modulus values of 1.7 g.p.d., 27%, and 30 g.p.d., respectively. The yarn is formed into 2-inch plain-weave ribbon. Standard laboratory soiling tests performed on this ribbon indicate that this polyurethane fabric possesses a greater resistance to and recovery from soiling than does a commercially available polyester fabric of similar construction.

EXAMPLE XII

This example demonstrates the preparation of copolyurethane according to the process of this invention.

Repetition of the general procedure of Example II in which one half of the molar quantity of 4,4'-(hexafluoroisopropylidene)-diphenol bischloroformate therein is substituted by 6.14 g. of the bischloroformate of 4,4'-(isopropylidene)bis(2,6-dichlorophenol), produces a white fibrous polymer which has an inherent viscosity of 0.95 and a polymer melt temperature of 342° C.

The products of three preparations on the scale described in the above paragraph are combined (average inherent viscosity is 0.87) and dry spun from a 25% solids solution in tetrahydrofuran/1,1,2-trichloroethane (90/10 by weight). The resulting fiber is drawn 2X at 215° C. and, after a relaxed scour in 0.5% detergent solution has the following physical properties: tenacity, 1.56 g.p.d.; elongation 17.4%; initial modulus 29.5 g.p.d. The fiber displays a high degree of recovery from hot-wet washing conditions, indicating an excellent potential for high performance in wash-wear fabrics.

The diamine of Example X can be prepared as follows:

EXAMPLE A

*$\alpha,\alpha,\alpha',\alpha'$-Tetramethyl-p-xylylenediamine*

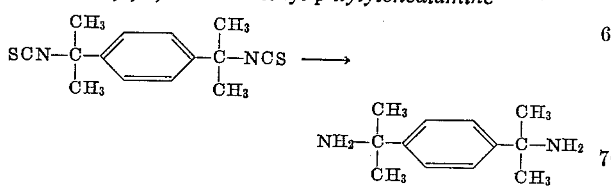

A mixture of 5 parts of potassium hydroxide (commercial grade, 87% pure) and 5 parts $\alpha,\alpha,\alpha',\alpha'$-tetramethyl-p-xylylene diisothiocyanate in 40 parts of ethanol was refluxed two hours. The cooled mixture was filtered and poured into 700 parts of water. The aqueous solution was extracted with ether (350 parts in three portions), and the extracts were discarded. The aqueous solution was acidified with concentrated hydrochloric acid during which time carbon oxysulfide was evolved. The acidified solution was basified with 10% sodium hydroxide and then extracted with ether (3× 140 parts). The ether extracts were dried over sodium sulfate and evaporated leaving 3.0 parts of crude $\alpha,\alpha,\alpha',\alpha'$-tetramethyl-p-xylylenediamine as a yellow oil. The infrared spectrum of the diamine had absorption at 3.0$\mu$, typical of amines, and no absorption at 4.6$\mu$, typical of the isothiocyanate functional group.

The diamine was taken up in 35 parts of ether, and the solution was saturated with hydrogen chloride. The diamine dihydrochloride salt precipitated as a white powder which was soluble in water or ethanol. The salt sublimed at 220–250° C. at 1 mm. of pressure.

EXAMPLE B

*$\alpha,\alpha,\alpha',\alpha'$-Tetramethyl-p-xylylenediamine*

A mixture of 37.5 parts of potassium hydroxide (commercial grade, 87% pure) and 25 parts $\alpha,\alpha,\alpha',\alpha'$-tetramethyl-p-xylylene diisothiocyanate in 95 parts of ethanol was refluxed two hours. The resulting suspension was acidified with concentrated hydrochloric acid, and the acidified mixture was then filtered. The filtrate was evaporated under vacuum, and the residue and the filter cake above were dissolved in water. The aqueous solution was filtered, and the clear filtrate was basified to a pH 12 with 10% aqueous sodium hydroxide. To the basic solution was added solid sodium chloride until the solution was saturated. The solution was then extracted with ether (3× 140 parts), the ether extracts were dried over sodium sulfate, and then the ether was removed by evaporation. $\alpha,\alpha,\alpha',\alpha'$-Tetramethyl-p-xylylenediamine, 15.5 parts (89%), was obtained as a white crystalline solid. The diamine had a boiling point of 85° C. at 0.2 mm. of pressure. The dihydrochloride salt of the diamine, infusible up to 400° C., had the following analysis.

*Analysis.*—Calcd. for $C_{12}H_{22}N_2Cl_2$: C, 54.34; H, 8.36; N, 10.56; Cl, 26.74. Found: C, 54.64; H, 8.58; N, 10.46; Cl, 25.49.

EXAMPLE C

*$\alpha,\alpha,\alpha',\alpha'$-Tetramethyl-p-xylylenediamine*

A mixture of 5 parts of $\alpha,\alpha,\alpha',\alpha'$-tetramethyl-p-xylylene diisocyanate and 15 parts of potassium hydroxide (commercial grade, 87% pure) in 40 parts of ethanol was refluxed two hours. The reaction product was poured into 300 parts of water, extracted with ether (3× 150 parts), and the aqueous phase was acidified with concentrated hydrochloric acid. The acid solution was then basified with 10% sodium hydroxide, saturated with sodium chloride by adding 100 parts of the salt, and extracted with ether (3× 105 parts). Evaporation of the ether left 1.5 parts of a white semisolid, which, on recrystallization from pentane, gave white crystals of $\alpha,\alpha,\alpha',\alpha'$-tetramethyl-p-xylylenediamine, M.P. 74° C. Spectral analysis confirmed that the sample was identical to that prepared in Example B.

EXAMPLE D

*$\alpha,\alpha,\alpha',\alpha'$-Tetramethyl-p-xylylene diisothiocyanate*

To a suspension of 109 parts of sodium thiocyanate in a solution of 100 parts of p-diisopropenylbenzene in 130 parts of benzene was added over one hour a mixture was made up of 200 parts of concentrated sulfuric acid and 62 parts of water. The temperature was kept at 40–45° C. by external cooling. After the addition of acid was complete, the temperature of the reaction was maintained at 40–45° C. for three hours. The flask was cooled, and 500 parts of water and 450 parts of benzene were added. The layers were separated, and the benzene layer was washed consecutively with water, sodium carbonate solution and water. After drying over magnesium sulfate, the benzene was evaporated to obtain as residue a viscous yellow oil that slowly crystallized. Recrystallization from 900 parts of 2B alcohol gave 111 parts (69%) of α,α,α',α'-tetramethyl-p-xylylene diisothiocyanate as white needles, M.P. 65° C.

*Analysis.*—Calcd. for $C_{14}H_{16}N_2S_2$: C, 60.83; H, 5.84; N, 10.14; S, 23.20. Found: C, 60.79; H, 5.95; N, 10.30; S, 22.95.

What is claimed is:

1. A novel polyurethane consisting essentially of recurring structural units represented by the following formula:

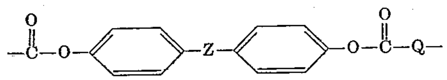

wherein Q represents a member of the group consisting of piperazinylene, lower alkyl substituted piperazinylene and

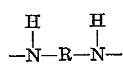

wherein R is meta-phenylene, para-phenylene, para-xylylene, α,α,α',α'-tetramethyl-para-xylylene, or a lower alkylidene di(para-cyclohexylene) radical; Z is a divalent radical containing no more than about 6 carbon atoms and having the formula $$-\overset{X}{\underset{Y}{C}}-$$

wherein X and Y are selected from the group consisting of perhalogenated lower alkyl with the proviso that X and Y together with the carbon atom to which they are attached may constitute a perfluorinated cyclic hydrocarbon group; and from 0 to 50% of units of the formula

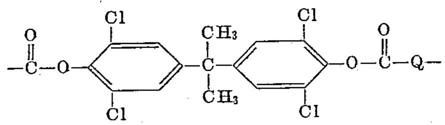

with Q having been defined above, said polymer having an inherent viscosity of at least 0.2 when measured as a 0.5% solution in meta-cresol at 30° C.

2. The fiber of the polymer of claim 1.

3. A high molecular weight fiber- and film-forming polyurethane consisting essentially of recurring structural units represented by the formula:

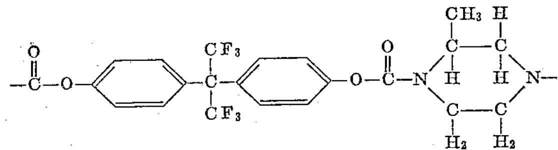

said polymer having an inherent viscosity of at least 0.2 when measured as a 0.5% solution in meta-cresol at 30. C.

4. A high molecular weight fiber- and film-forming polyurethane consisting essentially of recurring structural units of the formula:

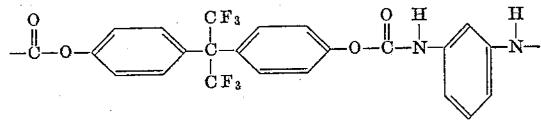

said polymer having an inherent viscosity of at least 0.2 when measured as a 0.5% solution in meta-cresol at 30. C.

5. A high molecular weight fiber- and film-forming polyurethane consisting essentially of recurring structural units of the formula:

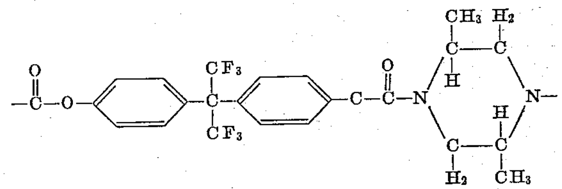

said polymer having an inherent viscosity of at least 0.2 when measured as a 0.5% solution in meta-cresol at 30. C.

6. A high molecular weight fiber- and film-forming polyurethane consisting essentially of recurring structural units of the following formulae in approximately equimolar proportions:

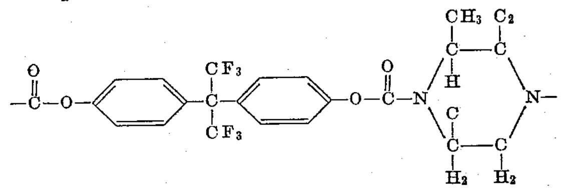

and

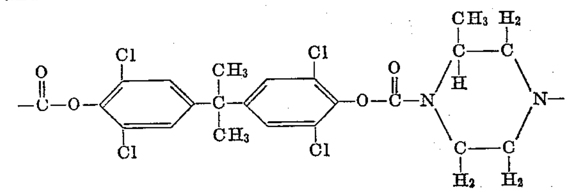

said polymer having an inherent viscosity of at least 0.2 when measured as a 0.5% solution in meta-cresol at 30° C.

7. A high molecular weight fiber- and film-forming polyurethane consisting essentially of recurring structural units of the formula:

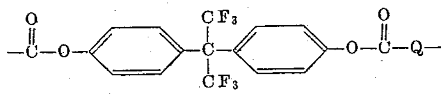

wherein Q represents a member of the group consisting of piperazinylene, lower alkyl substituted piperazinylene, and

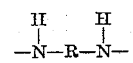

wherein R is meta-phenylene, para-phenylene, para-xylylene, or a lower alkylidene di(para-cyclohexylene) radical, said polymer having an inherent viscosity of at least 0.2 when measured as a 0.5% solution in meta-cresol at 30. C.

References Cited

UNITED STATES PATENTS

| | | | |
|---|---|---|---|
| 2,731,445 | 1/1956 | Wittbecker | 260—47 |
| 3,206,438 | 9/1965 | Jamison et al. | 260—78 |
| 3,296,201 | 1/1967 | Stephens | 260—47 |

WILLIAM H. SHORT, *Primary Examiner.*

L. LEE, *Assistant Examiner.*

UNITED STATES PATENT OFFICE
CERTIFICATE OF CORRECTION

Patent No. 3,373,139 March 12, 1968

Paul Winthrop Morgan

It is hereby certified that error appears in the above numbered patent requiring correction and that the said Letters Patent should read as corrected below.

Column 7, lines 57 and 68, and column 8, lines 14 and 59, for "30.C.", each occurrence, read -- 30° C. --; column 8, lines 3 to 10, for that portion of the formula reading $$-C-\overset{O}{\overset{\|}{C}}-N \qquad \text{read} \qquad -O-\overset{O}{\overset{\|}{C}}-N$$

lines 20 to 27, for that portion of the formula reading

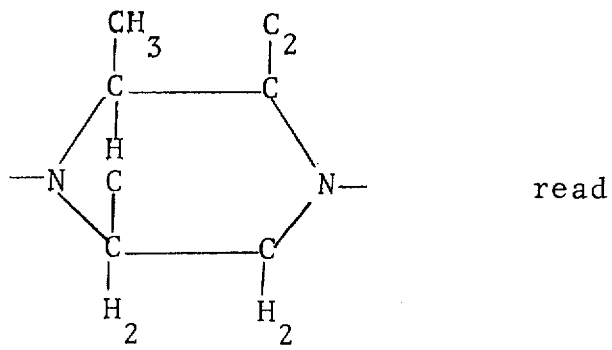

read

CH3, H2, C, C, H, N, N, C, C, H2, H2

Signed and sealed this 22nd day of July 1969.

(SEAL)
Attest:

EDWARD M.FLETCHER,JR.
Attesting Officer

WILLIAM E. SCHUYLER,JR.
Commissioner of Patents